United States Patent
Narh

(10) Patent No.: US 7,210,345 B2
(45) Date of Patent: May 1, 2007

(54) FORCED HARMONIC VIBRATION MASTER GEAR

(75) Inventor: Enoch Narh, Woodridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 152 days.

(21) Appl. No.: 11/108,212

(22) Filed: Apr. 18, 2005

(65) Prior Publication Data

US 2006/0000268 A1 Jan. 5, 2006

Related U.S. Application Data

(60) Provisional application No. 60/584,509, filed on Jun. 30, 2004.

(51) Int. Cl.
*G01M 13/02* (2006.01)
*G01B 9/08* (2006.01)

(52) U.S. Cl. .................. 73/162; 73/593; 33/501.19

(58) Field of Classification Search .................. 73/162, 73/118.1, 593; 33/501.19, 501.13, 501.7, 33/501.8, 501.16; 74/457
See application file for complete search history.

(56) References Cited

U.S. PATENT DOCUMENTS

| | | | |
|---|---|---|---|
| 2,661,542 A | | 12/1953 | Bean |
| 3,921,304 A | * | 11/1975 | Yagiela .................. 33/501.19 |
| 4,488,359 A | * | 12/1984 | Misson ...................... 33/501.8 |
| 4,687,556 A | * | 8/1987 | Sutton et al. ............... 205/151 |
| 4,704,799 A | * | 11/1987 | Kobetsky .................. 33/501.8 |

(Continued)

FOREIGN PATENT DOCUMENTS

EP 0 325 688 8/1989

(Continued)

OTHER PUBLICATIONS

European Search Report dated Jul. 26, 2006.

(Continued)

*Primary Examiner*—Hezron Williams
*Assistant Examiner*—Jacques M. Saint-Surin
(74) *Attorney, Agent, or Firm*—Mark W. Croll; Donald J. Breh; Levenfeld Pearlstein LLC

(57) ABSTRACT

A forced harmonic vibration master gear for use in a device for detecting imperfections in a production gear includes a gear body having a plurality of gear teeth. Each of the plurality of gear teeth has a graduation of material added thereto extending from a form diameter of each tooth to an end of the tooth to decrease the pressure angle of the tooth. The forced harmonic master gear when used to test an unacceptable production gear, induces in the unacceptable production gear, when rotating, a vibrational force that is at least 50 percent greater than a vibrational force exhibited by the unacceptable production gear when a standard master gear is used to test the unacceptable production gear, in at least one band of 70 Hz to 150 Hz, 151 Hz to 300 Hz, 301 Hz to 550 Hz, 551 Hz to 1250 Hz and 1251 Hz to 2000 Hz. When the forced harmonic master gear is used to test an acceptable production gear, the acceptable production gear, when rotating, exhibits a vibrational force that is no more than 25 percent greater than a vibrational force exhibited by the acceptable production gear when a standard master gear is used to test the acceptable production gear.

7 Claims, 3 Drawing Sheets

U.S. PATENT DOCUMENTS

| | | | |
|---|---|---|---|
| 5,016,471 A * | 5/1991 | Och | 73/162 |
| 5,288,556 A * | 2/1994 | Lemelson | 428/408 |
| 5,513,442 A | 5/1996 | Flair | |
| 6,347,548 B1 * | 2/2002 | Powrie | 73/162 |

FOREIGN PATENT DOCUMENTS

| | | |
|---|---|---|
| EP | 0 744 607 | 11/1996 |
| GB | 1599905 | 10/1981 |
| JP | 5384758 | 7/1978 |
| JP | 59 116525 | 7/1984 |
| JP | 06 307985 | 11/1994 |

OTHER PUBLICATIONS

"A new kind of gear measurement technique" from Measurement Science and Technology, IOP, Bristol, GB dated Jul. 1, 1997.

* cited by examiner

FORCED HARMONIC VIBRATION MASTER GEAR

CROSS REFERENCE TO RELATED APPLICATION DATA

The present application claims the benefit of priority of provisional U.S. Patent Application Ser. No. 60/584,509, filed Jun. 30, 2004.

BACKGROUND OF THE INVENTION

The present invention relates to a master gear. More particularly, the present invention relates to a master gear for use in gear checking, that uses forced harmonic vibration.

Gears, particularly those used in gear systems for automotive use, e.g., automotive transmissions, are often checked to assure that the gears are properly formed. That is, the gears are checked to assure that they are formed without burrs, grind marks, and the like. Other imperfections include plus material in tooth formation, waviness and improper finish and imperfections in the involute. These imperfections can cause vibration and "noise" that can be transferred to the vehicle which can result in vehicle vibration, noise and reduced life of the driving or driven components.

The gears are checked in a dynamic environment, that is with the gear rotating at some predetermined speed. The gear being checked, or production gear, is driven and meshes with a reference or standard gear, or master gear. In a typical arrangement, the production gear is driven (i.e., applies a driving torque) and the master gear is configured similar to the mating gear of the gear being checked. The master gear has a resistance applied to simulate an actual operating environment. Imperfections in the gear are typically identified at the normal frequency of the gear or at a harmonic of that frequency.

In order to determine whether there are imperfections in the production gear, external devices or sensors (such as accelerometers) are used to monitor the vibrations induced in the system by the rotating gears. In a typical arrangement, measurements are taken at the gear being tested (on the testing structure adjacent to the gear) and at the master gear, for example on the master gear spindle.

It has, however, been found that at times, there are vibrations induced in the system that are above a desired or target level, but that do not exceed a threshold level indicating an imperfection in the gear. Essentially, although the checking system performs satisfactorily, it may not be sufficiently sensitive (e.g., induce sufficient energy to the tested gear) to identify imperfections that otherwise should be corrected.

Accordingly, there is a need for a gear checking system and master gear that are sufficiently sensitive to identify otherwise acceptable imperfections in gears. Desirably, such a master gear induces exaggerated energy levels in gears that exhibit imperfections, but does not exhibit such an exaggeration in gears that exhibit normal or within range vibration.

BRIEF SUMMARY OF THE INVENTION

A forced harmonic vibration master gear is configured for use in a device for detecting imperfections in a production gear. The forced harmonic master gear includes a gear body having a plurality of gear teeth. Each of the plurality of gear teeth has a graduation of material added thereto extending from the form diameter of each tooth to an end of the tooth to decrease the pressure angle of the tooth.

When the forced harmonic master gear is used to test an unacceptable production gear, the unacceptable production gear, when rotating, exhibits a vibrational force that is at least 50 percent greater than a vibrational force exhibited by the unacceptable production gear when a standard master gear is used to test the unacceptable production gear, in at least one band of 70 Hz to 150 Hz, 151 Hz to 300 Hz, 301 Hz to 550 Hz, 551 Hz to 1250 Hz and 1251 Hz to 2000 Hz.

When the forced harmonic master gear is used to test an acceptable production gear, the acceptable production gear, when rotating, exhibits a vibrational force that is no more than 25 percent greater than a vibrational force exhibited by the acceptable production gear when a standard master gear is used to test the acceptable production gear.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
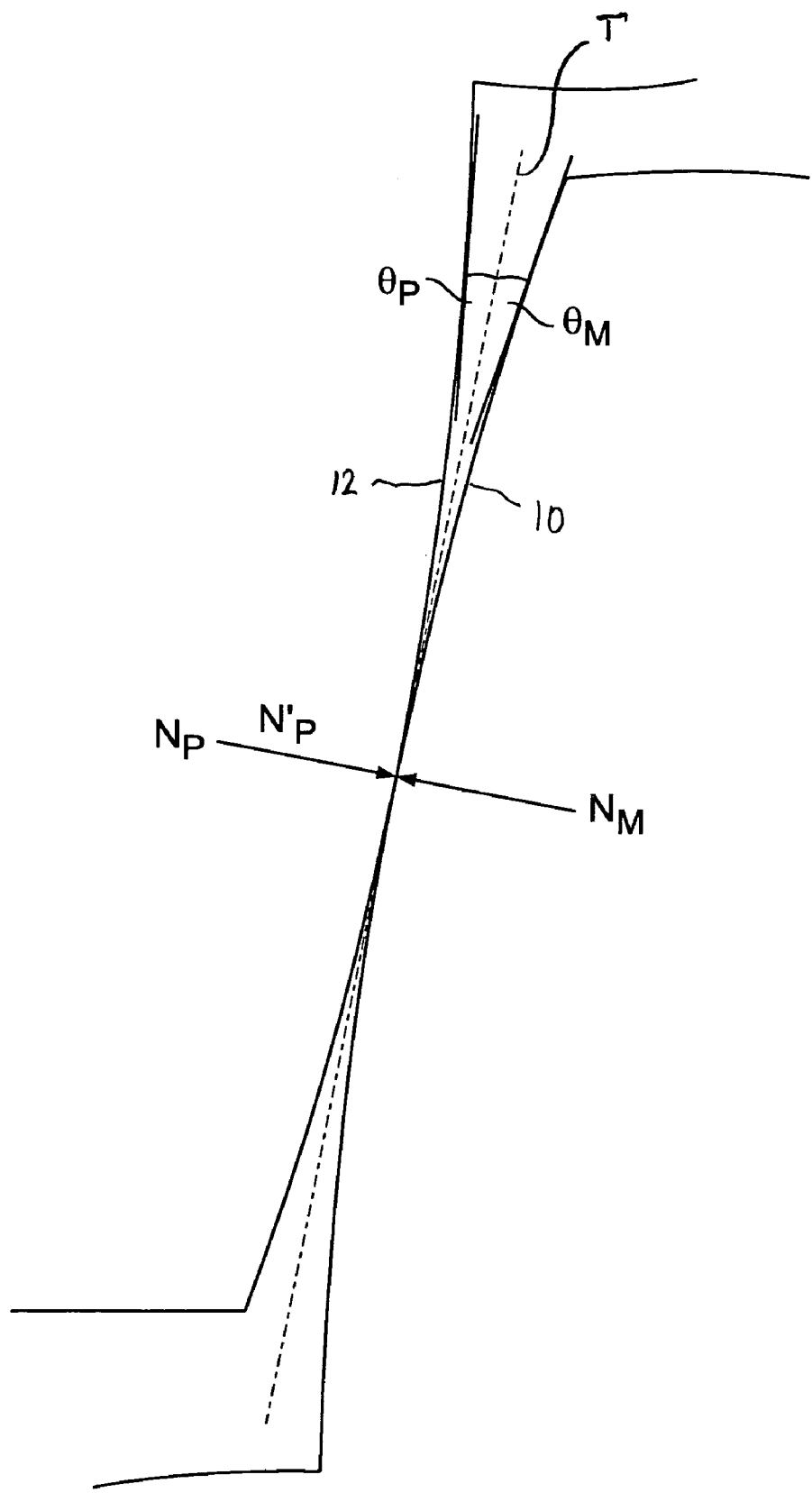
FIG. 1 illustrates a conventional master gear and production gear in mesh and shows the various forces and angles, and in which both gears' teeth have no deviations (an ideal or theoretical case)

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be understood that the title of this section of this specification, namely, "Detailed Description Of The Invention", relates to a requirement of the United States Patent Office, and does not imply, nor should be inferred to limit the subject matter disclosed herein.

Referring now to the figures and in particular to FIG. 1, there is illustrated a conventional master gear 10, enmeshed with a production gear 12. This figure illustrates the various angles, $\theta_M$, $\theta_P$ (the angles between the tangent line T and the tooth of the master gear and the production gear, respectively), which are equal to one another, and the forces exerted by the master and production gears, $N_M$, $N_P$, and the resultant force $N_{P'}$ (which is the difference between the forces $N_P - N_M$). In this system, $N_P$ and $N_M$ are collinear and $N_P$ is greater than $N_M$. Assumptions in illustrating this system include that there is a perfect involute, that the pressure angles of the gears are identical and that there is no deviation from the true theoretical involute form.

Figure 2:
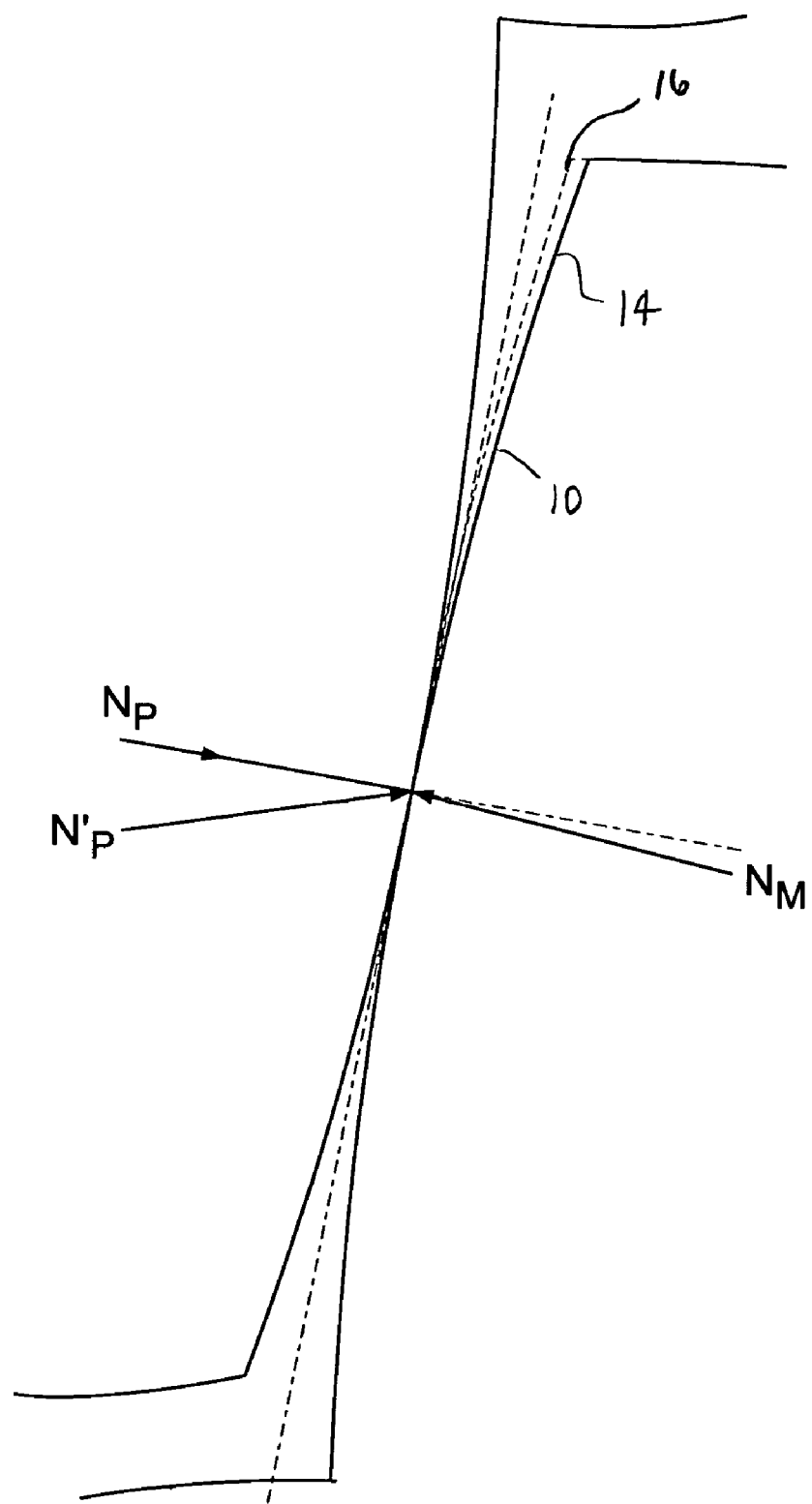
FIG. 2 illustrates the conventional master gear (with its normal involute deviation in dashed lines) in mesh with a production gear when an imperfection in the production gear is encountered.

FIG. 2 illustrates a standard or conventional master gear 10, and shows that with the deviations in the involute profile and pressure angle of a conventional master gear, the resultant force $N_{P'}$ shifts and takes the position as shown. In this case, the theoretical tooth profile is indicated at 16 (in dashed lines) and the actual tooth profile, which is indicated at 14 (in solid lines), is shown with minus (−) material. Here, the forces $N_P$ and $N_M$ are no longer collinear. Consequently, the effective driving torque (of the production gear) is less due to the (angular) direction of $N_{P'}$ relative to $N_P$. With a lesser driving torque, the angular momentum of the production gear will be reduced. In this system, an external device or sensor will therefore read changes in angular momentum of lesser magnitude. It is of note that changes in angular momentum are a result of $N_{P'}$ encountering imperfections along the involute form of the production gear teeth, such as nicks, scallops, waviness or the like. In this system, it is assumed that there are imperfections.

Figure 3:
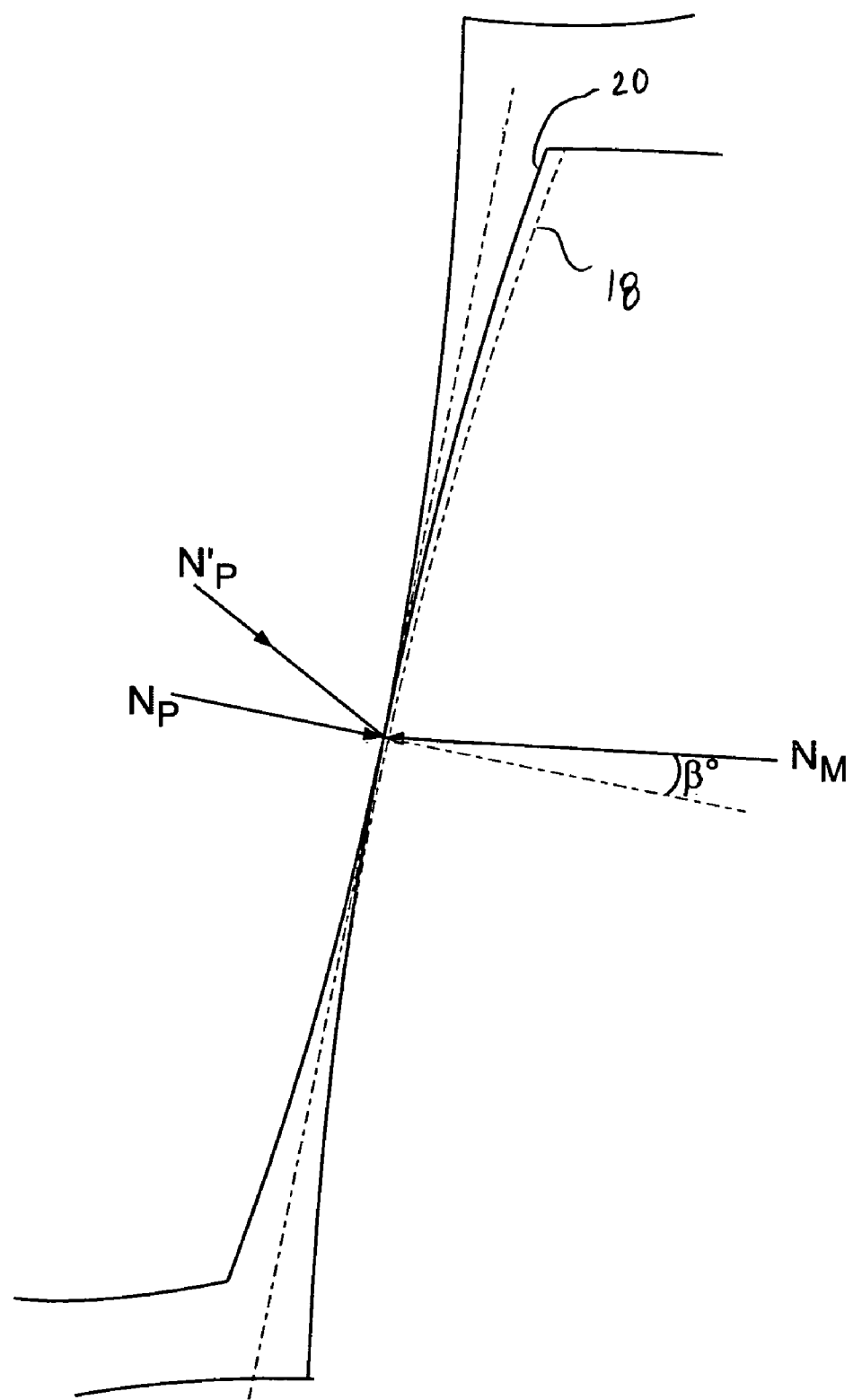
FIG. 3 illustrates the present forced harmonic vibration master gear in mesh with a production gear.

FIG. 3 illustrates a system in which plus material (added material over and above the profile of a conventional master gear) is present on the master gear, that results in a decrease in the pressure angle of the gear. In this figure of the gear 10, the theoretical tooth profile is indicated at 18 (in dashed lines) and the actual tooth profile which is indicated at 20 (in solid lines), is shown with plus (+) material. The decrease in pressure angle results in a shift in the direction and position of $N_M$ by an angle $\beta'$. The shift causes the resultant force of $N_M$ and $N_P$ to shift to the position and direction illustrated by $N_{P''}$. Relative to the resultant force $N_{P'}$ shown in FIG. 2 (which is the resultant force in a system with a master gear without the plus material on the gear tooth), the shift in the resultant force $N_{P'}$ provides a driving torque that brings about a significant change in angular momentum. In this system, an external device or sensor will read changes in angular momentum of greater magnitude. The plus material in the present gear is at least about 0.0002 inches.

That is, the greater change in angular momentum is exaggerated by the plus material (the reduced pressure angle) and as such, the sensor will sense smaller deviations or imperfections in the production gear.

As will be appreciated by those skilled in the art, the plus material is in fact a graduated addition of material (a graduated increase in size) of the master gear teeth, that commences at about the form diameter of the tooth and results in a decrease in pressure angle. In a present gear, the reduction in pressure angle is at least about 0.059 degrees for a gear having a working depth of 0.1948 inches (the distance from the form diameter to the outside diameter).

As will also be appreciated by those skilled in the art, the plus material gives rise to an increase in contact pressure. This increase in contact pressure causes an increase in vibrations whenever the involute of the (forced harmonic vibration) master gear encounters imperfections in or on the involute form of the production gear. This vibration is forced harmonic vibration.

It can also be viewed that the plus material induces a cam-action against the mating gear. This cam action gives rise to an increased sensitivity. The increased sensitivity increases the ability to detect imperfections in or on the involute form of the production gear. The directional change in the resultant force (indicated as $N_{P'}$ in FIG. 3), favors increase in change of angular momentum.

From a practical perspective, there are two types of gears, acceptable or "good" gears and unacceptable or "bad" gears. The good or bad characteristics of the gear can be exhibited on the forward flank of the gear (the front face of the gear teeth) or on the rear flank of the gear (the rear face of the gear teeth) or on both flanks of the gear teeth. The vibrational characteristics are measured by engaging the gear with a master gear to determine the "bad" characteristics compared to a good gear or baseline characteristics.

In order to determine whether a gear is unacceptable or bad, sufficiently high energy levels must be exhibited when compared to the energy levels exhibited by an acceptable or good gear under the same conditions. Vibrational forces are measured in units of milliGs (thousandths of a G). The forced harmonic vibration master gear serves to increase the difference in force that is induced between a good gear and a bad gear. That is, it tend to show a greater difference between a "good" gear and a "bad" gear.

Table 1 below illustrates the differences in vibrational forces that were measured for two gears, a bad gear (Gear No. 6) and a good gear (Gear No. 9) using a standard master gear (Std. Master) and a forced harmonic vibration master gear (FHARVIBE master) embodying the principles of the present invention. The compared gears were 57 teeth gears rotating at 120 revolutions per minute. The gears had a working depth of 0.1948 inches. Measurements were taken in five different vibration ranges or bands, in which band 1 is 70 Hz to 150 Hz, band 2 is 151 Hz to 300 Hz, band 3 is 301 Hz to 550 Hz, band 4 is 551 Hz to 1250 Hz and band 5 is 1251 Hz to 2000 Hz. The measurements were taken by accelerometers located on the structure adjacent to the tested gear (indicated as GEAR) and on the master gear spindle (MSTR) for both the standard and FHARVIBE master gears. Measurements were taken with the gear rotating in both the forward and reverse directions in that the test was single flank test, that is, only one face (front or rear face) of the gear teeth was tested at a time.

TABLE 1

COMPARISON OF VIBRATIONAL FORCES EXHIBITED FOR
STANDARD AND FORCED HARMONIC VIBRATION MASTER GEARS

| Gear # | Band | Forward | | | | Reverse | | | |
| | | Gear | | Master | | Gear | | Master | |
| | | FHARVIB | STD | FHARVIB | STD | FHARVIB | STD | FHARVIB | STD |
|---|---|---|---|---|---|---|---|---|---|
| 6 | 1 | 85 mG | 51 mG | 151 mG | 62 mG | 18 mG | 12 mG | 38 mG | 17 mG |
| 9 | 1 | 10 | 10 | 19 | 17 | 13 | 15 | 12 | 13 |
| 6 | 2 | 165 | 97 | 177 | 106 | 63 | 73 | 42 | 51 |
| 9 | 2 | 7 | 6 | 10 | 8 | 27 | 38 | 20 | 11 |
| 6 | 3 | 93 | 66 | 214 | 157 | 18 | 15 | 32 | 30 |
| 9 | 3 | 6 | 13 | 11 | 11 | 62 | 47 | 54 | 43 |
| 6 | 4 | 72 | 92 | 41 | 73 | 36 | 14 | 16 | 8 |
| 9 | 4 | 48 | 18 | 9 | 12 | 34 | 21 | 27 | 27 |

TABLE 1-continued

COMPARISON OF VIBRATIONAL FORCES EXHIBITED FOR
STANDARD AND FORCED HARMONIC VIBRATION MASTER GEARS

| Gear # | Band | Forward | | | | Reverse | | | |
| --- | --- | --- | --- | --- | --- | --- | --- | --- | --- |
| | | Gear | | Master | | Gear | | Master | |
| | | FHARVIB | STD | FHARVIB | STD | FHARVIB | STD | FHARVIB | STD |
| 6 | 5 | 4 | 5 | 11 | 11 | 2 | 1 | 2 | 1 |
| 9 | 5 | 2 | 1 | 3 | 2 | 3 | 2 | 3 | 3 |

In evaluating the data it will be understood that limits were established within which the vibrational forces are found to be acceptable. In the present example, the limits in band 1 (70 to 150 Hz) were 38 mG and 118 mG for the GEAR accelerometer and the MSTR accelerometer, respectively, in the forward direction and 104 mG and 202 mG for the GEAR accelerometer and the MSTR accelerometer, respectively, in the reverse direction; in band 2 (151 to 300 Hz) were 79 mG and 84 mG for the GEAR accelerometer and the MSTR accelerometer, respectively, in the forward direction and 345 mG and 146 mG for the GEAR accelerometer and the MSTR accelerometer, respectively, in the reverse direction; in band 3 (301 to 550 Hz) were 27 mG and 136 mG for the GEAR accelerometer and the MSTR accelerometer, respectively, in the forward direction and 29 mG and 139 mG for the GEAR accelerometer and the MSTR accelerometer, respectively, in the reverse direction; in band 4 (551 to 1250 Hz) were 89 mG and 28 mG for the GEAR accelerometer and the MSTR accelerometer, respectively, in the forward direction and 22 mG and 25 mG for the GEAR accelerometer and the MSTR accelerometer, respectively, in the reverse direction; and in band 5 (1251 to 2000 Hz) were 4 mG and 4 mG for the GEAR accelerometer and the MSTR accelerometer, respectively, in the forward direction and 3 mG and 2 mG for the GEAR accelerometer and the MSTR accelerometer, respectively, in the reverse direction.

An evaluation of the data shows that where the vibrational forces of the "bad" gear are "bad", there is, for the most part, a significant difference between the present forced harmonic (FHARVIBE) master gear value and the value of a standard master gear. For example, in band 1, for the "bad" gear 6, in the forward direction, as measured at the tested gear, the difference between the FHARVIBE gear value of 85 mG and the standard master gear value of 51 mG is about 34 mG, or a 66.7 ((85 mG–51 mG)/51 mG) percent increase in vibrational force measure using the FHARVIBE gear over the standard master gear, and as measured at the master gear, the differences are ((151 mG–62 mG)/62 mG) or 143.5 percent. Conversely, for the "good" gear 9, there is a zero percent difference as measured at the tested gear and an 11.8 percent difference.

In band 2, in the forward direction, as measured at the tested and master gears, the differences are 70.1 percent and 67.0 percent increases, respectively and for the bad gear and 16.7 percent 25.0 percent for the good gear. In bands 3, 4 and 5, the results are not as dramatic.

In the reverse direction, in band 1, as measured at the tested and master gears, the differences are 50.0 percent and 123.5 percent increases, respectively and for the bad gear and –13.3 percent –7.7 percent for the good gear. In band 2, as measured at the tested and master gears, the differences are –13.7 percent and –17.6 percent increases, respectively and for the bad gear and –29.0 percent 81.8 percent for the good gear.

It can be seen that in the case of the bad gear, the differences are significantly higher, as compared to the good gear, thus allowing a better more assured determination of a bad (or unacceptable) gear, based upon the gear vibrational force characteristics.

All patents referred to herein, are hereby incorporated herein by reference, whether or not specifically done so within the text of this disclosure.

In the disclosures, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A forced harmonic vibration master gear for use in a device for detecting imperfections in a production gear including burrs, grind marks, plus material in tooth formation, waviness, improper finish, imperfections in the involute wherein said production gear is driven by a driving torque and is enmeshed with said forced harmonic vibration master gear wherein said forced harmonic vibration master gear is configured similar to said production gear wherein said forced harmonic vibration master gear when rotating induces exaggerated energy levels in said production gear to cause an increase in vibrational force of said production gear wherein said increased vibrations are forced harmonic vibrations whenever the involute of said forced harmonic vibration master gear encounters an imperfection in or on the involute form of said production gear, said forced harmonic vibration master gear comprising a standard conventional master gear body having a plurality of gear teeth each of said plurality gear teeth having a graduation of material added thereto extending from the form diameter of each tooth to an end of the tooth as a means to decrease the pressure angle and cause an increase in contact pressure of the tooth so that said forced harmonic vibration master gear, when rotating as enmeshed with said driven production gear causes an increase in vibrational force of said production gear when the involute of said master gear encounters imperfections in or on the involute form of said forced harmonic vibration production gear.

2. The forced harmonic master gear in accordance with claim 1 wherein when the forced harmonic master gear is used to test an unacceptable production gear, the unacceptable production gear, when rotating, exhibits a vibrational force that is at least 50 percent greater than a vibrational force exhibited by the unacceptable production gear when a standard master gear is used to test the unacceptable production gear, in at least one band of 70 Hz to 150 Hz, 151 Hz to 300 Hz, 301 Hz to 550 Hz, 551 Hz to 1250 Hz and 1251 Hz to 2000 Hz, and wherein when the forced harmonic master gear is used to test an acceptable production gear, the acceptable production gear, when rotating, exhibits a vibrational force that is no more than 25 percent greater than a vibrational force exhibited by the acceptable production gear when a standard master gear is used to test the acceptable production gear.

3. The forced harmonic master gear in accordance with claim 2 wherein when the forced harmonic master gear is used to test an unacceptable production gear, the unacceptable production gear, when rotating, exhibits a vibrational force that is at least 65 percent greater than a vibrational force exhibited by the unacceptable production gear when a standard master gear is used to test the unacceptable production gear.

4. The master gear in accordance with claim 2 wherein when the forced harmonic master gear is used to test an acceptable production gear, the acceptable production gear, when rotating, exhibits a vibrational force that is no more than 20 percent greater than a vibrational force exhibited by the acceptable production gear when a standard master gear is used to test the acceptable production gear.

5. The master gear in accordance with claim 1 wherein the forced harmonic vibration master gear and said standard master gear as test gears have 57 teeth in a comparison measurement of substantial vibrational forces measured for standard and forced harmonic master gears in a single flank test wherein a significant increased vibrational force difference is present between values measured between the results of said forced harmonic vibration master gear and said standard master gear.

6. The forced vibration master gear in accordance with claim 1 wherein the graduated material increase is added to each of the teeth is at least about 0.0002 inches as a means to result in a decrease in the pressure angle of each tooth of at least about 0.059 degrees for forced harmonic vibration master gear teeth having a working depth of 0.1948 inches to cause an increase in contact pressure, of each tooth such that increased contact pressure causes an increase in vibrations in said production gear whenever the involute of the forced harmonic vibration master gear encounters imperfections in or on the involute form of the production gear, wherein said increased vibrations are said forced harmonic vibrations.

7. The master gear in accordance with claim 1 wherein the reduction in the pressure angle of each tooth is at least about 0.059 degrees for a gear having a working depth of 0.1948 inches, the distance from the form diameter to the outside diameter.

* * * * *

UNITED STATES PATENT AND TRADEMARK OFFICE
CERTIFICATE OF CORRECTION

| | |
|---|---|
| PATENT NO. | : 7,210,345 B2 |
| APPLICATION NO. | : 11/108212 |
| DATED | : May 1, 2007 |
| INVENTOR(S) | : Narh |

Page 1 of 1

It is certified that error appears in the above-identified patent and that said Letters Patent is hereby corrected as shown below:

Col. 6, claim 1, line 18 should read:

--plurality of gear teeth having a graduation of material added--

Col. 8, claim 6, line 2 should read:

--claim 1 wherein the graduated material increase added to--

Col. 8, claim 6, line 7 should read:

--to cause an increase in contact pressure of each tooth such--

Signed and Sealed this

Tenth Day of July, 2007

JON W. DUDAS
*Director of the United States Patent and Trademark Office*